July 14, 1942.  W. L. HANSEN ET AL  2,289,495
SELF STARTING SYNCHRONOUS ELECTRICAL MOTOR
Filed Feb. 18, 1939  3 Sheets-Sheet 1
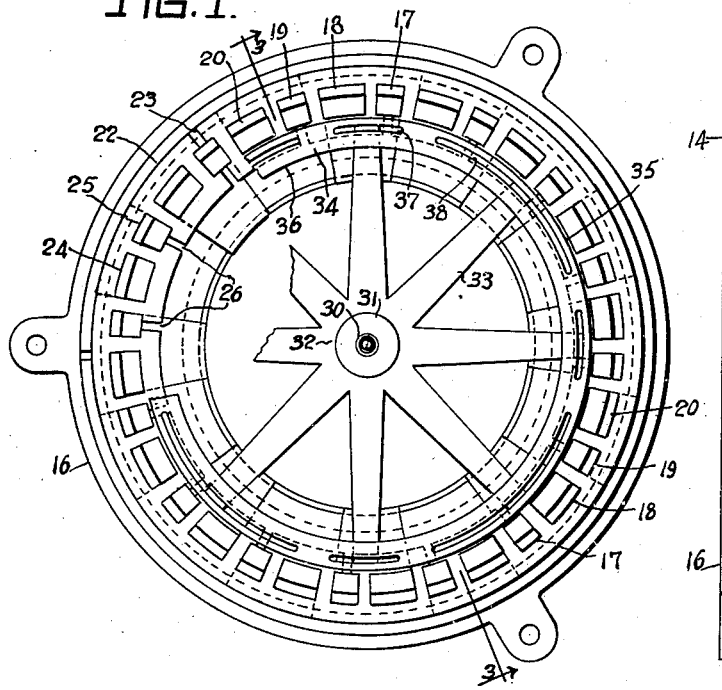
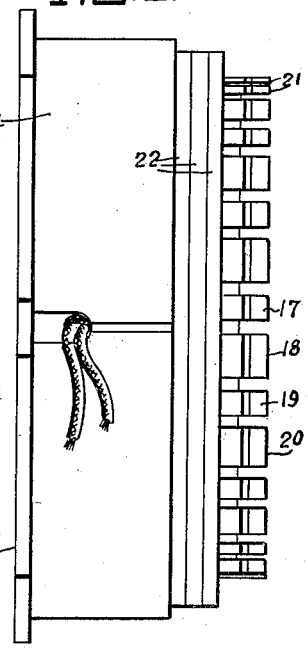
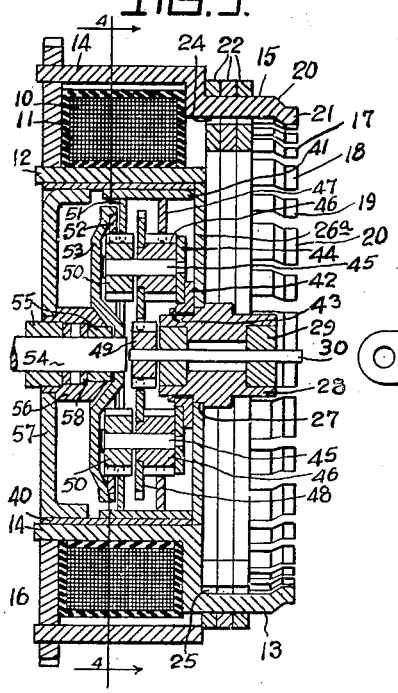
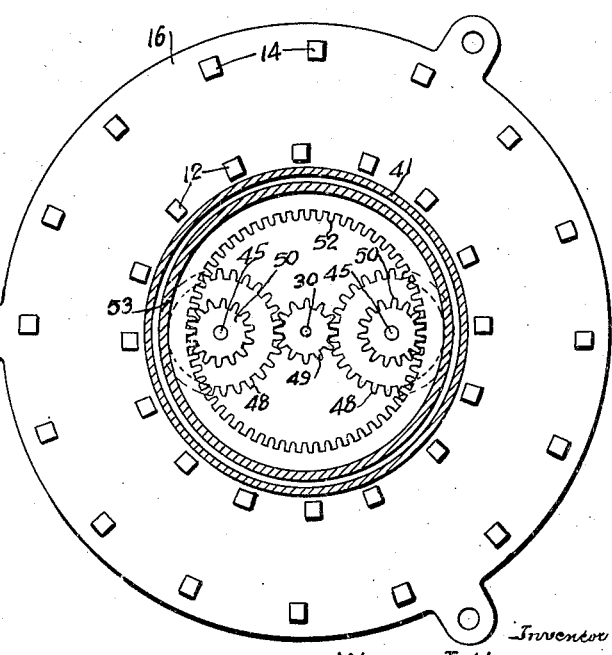
Inventor
WILLIAM L. HANSEN,
IRA N. HURST,
BY
Toulmin & Toulmin
Attorneys.

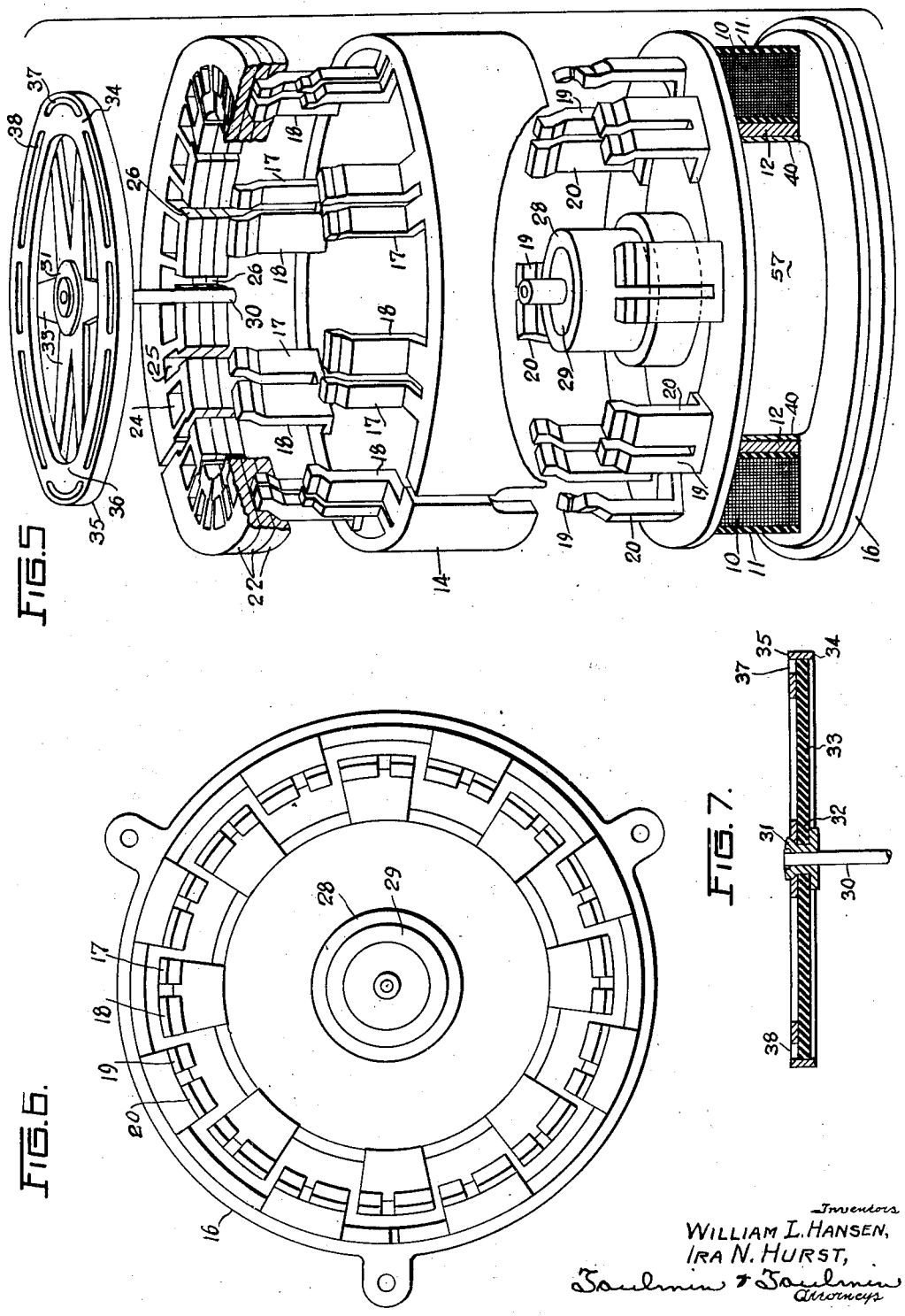

Inventors
WILLIAM L. HANSEN,
IRA N. HURST,

Patented July 14, 1942

2,289,495

UNITED STATES PATENT OFFICE 2,289,495

SELF-STARTING SYNCHRONOUS ELECTRICAL MOTOR

William L. Hansen and Ira N. Hurst, Princeton, Ind., assignors to Hansen Mfg. Company, Inc., Princeton, Ind., a corporation of Indiana Application February 18, 1939, Serial No. 257,166

3 Claims. (Cl. 172—278)

This invention relates to electric motors and particularly to synchronous alternating current motors.

One object of this invention is to provide a synchronous motor wherein the field poles are arranged in a cylindrical formation around the rotor, the poles being bifurcated and portions thereof shaded, provisions being made for balancing the magnetic flux between the shaded and the unshaded poles.

Another object is to provide a synchronous motor of the above type wherein the shaded portion of each bifurcated pole is made somewhat larger than the unshaded portion, thereby tending to balance the magnetic flux between the two pole portions.

Another object is to provide a synchronous motor having field pole pieces projecting from the field structure and cooperating with a ring shaped rotor having arcuate slots running concentric with the rim so as to establish magnetic poles, these slots being so located as to begin and end at points in the stator where stator poles of unlike polarity are located.

Another object is to provide a synchronous motor with pole pieces projecting from the field structure in a cylindrical formation and a rotor having its rim rotating inside this formation the tips of the pole pieces being bent inwardly so as to provide a face which will approximately match the opposing face on the rim of the rotor, thereby causing the rotor to "float" during its rotation when the field coil is energized without the necessity of any additional means to keep it from chattering against an end thrust in either direction.

Another object is to provide a synchronous motor having a field coil with outer and inner annular cylindrical magnetic members having pole pieces projecting therefrom in a cylindrical formation, the pole pieces coming from the inner side of the field coil being alternated with those coming from the outer side of the field coil in this cylindrical formation.

Another object is to provide a synchronous motor of the type set forth in the previous object wherein each field pole is bifurcated with one of the bifurcations of each pole piece shaded as by a copper shading ring so as to provide a lag in the magnetic flux for facilitating starting of the motor.

Another object is to provide a synchronous motor having a rotor with an annular magnetic member containing arcuate slots of unequal length located therein and preferably concentric with the axis of rotation of the rotor.

Another object is to provide a synchronous motor having a rotor consisting of an annular rim and bifurcated permanently magnetic spokes.

Another object is to provide a motor with a rotor having an annular rim of permanently magnetic material, spokes also of permanently magnetic material, each spoke being approximately Y shaped with twin poles adjacent the rim.

Another object is to provide a synchronous motor with a rotor as set forth in the preceding object wherein the spoke structure is made in an integral assembly and placed with the annular rim preferably by a slight fit, the rim preferably having an annular flange on one side thereof.

In the drawings:

Figure 1 is a front elevation of the synchronous motor of this invention with a portion of the rotor broken away to disclose the construction more clearly;

Figure 2 is a left hand side elevation of the motor shown in Figure 1;

Figure 3 is a longitudinal section taken along the line 3—3 in Figure 1 with the rotor removed;

Figure 4 is a cross-section taken along the line 4—4 in Figure 3;

Figure 5 is an exploded perspective view of the motor shown in Figures 1 to 4 inclusive partly in section to disclose the internal structure more clearly;

Figure 6 is a front elevation of the motor with the rotor and shading rings removed to disclose the field structure more clearly;

Figure 7 is a radial section through the rotor taken in a plane passing through the axis of rotation;

General construction

Figure 8:
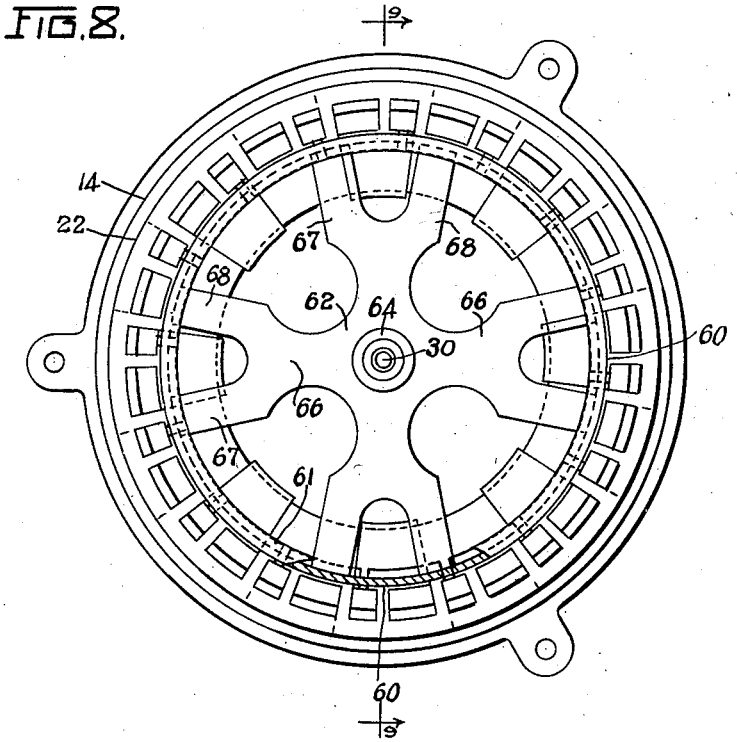
Figure 8 is a front elevation of a modified form of rotor having Y shaped magnetic spokes.

In general the synchronous motor of this invention consists of a field coil encased in steel formings surrounding the coil and having pole pieces extending laterally in a cylindrical formation. Each pole piece is bifurcated, the two portions thus formed being of unequal widths. Shading rings of non-magnetic conducting material such as copper are mounted upon these pole portions so as to surround each of the wider pole portions of the pole pieces but prevented from entirely surrounding the smaller pole portions by having an air gap extending inwardly to each smaller pole portion from the inner edge of the shading ring. Each shading ring is slotted radially at one point in its periphery so as to interrupt the continuity thereof.

The shaded pole portion is made of approximately one-third greater width than the unshaded pole portion in order to approximately balance the magnetic flux in the two portions.

The tips of the pole portions project slightly inwardly toward the rim of the rotor so as to match the opposing surface of the latter. This construction causes the rotor to "float" during rotation when the field coil is energized, thereby eliminating the necessity for providing additional means for preventing chattering by reason of an end thrust in either direction.

The rotor is ring shaped of hardened carbon steel and has an annular flange projecting inwardly toward the axis of rotation. This annular flange is provided with arcuate slots, preferably concentric with the axis of rotation of the rim. The slots are positioned so as to begin and end at points in the stator where poles of unlike polarity are located. These slots provide a means for quickly synchronizing the rotor and give additional locking force by being located inwardly from the stator poles. The slots are spaced and are preferably of unequal lengths so as to make permanent magnets not subject to shifting during starting. The balance of the rotor slots form divisions extending a greater distance than from one unlike pole to another.

The rotor is preferably mounted upon a non-magnetic spider or spokes terminating in a hub and a shaft. The modified form of rotor shown in Figures 8 and 9 however, employs a magnetic rim of permanent magnetic material such as hardened carbon steel together with a permanently magnetic spider including a bifurcated or Y shaped magnetic spokes; thus each of these magnetic spokes has twin poles located adjacent the rotor rim.

The space inside the field structure provides a chamber for the reception of the reduction gearing ordinarily required when such a motor is used for operating a clock.

The reduction gearing employed in the present motor is of a planetary type, thereby accommodating the gearing within a very compact space. The annular field structure also surrounds the gearing and protects it from damage or from unauthorized tampering.

*Field structure*

Referring to the drawings in detail, Figure 3 shows a preferred embodiment of the synchronous motor of this invention as consisting of a field coil or winding 10, enclosed in an annular insulating casing 11, of fiber or other suitable material. Inside the field coil 10 is mounted a cylindrical magnetic member 12 having L shaped pole projections 13 extending therefrom (Figure 3). Similarly, outside the field coil 10 is mounted a cylindrical magnetic member 14 having L shaped pole projections 15, alternating with the pole projections 13 to make up a cylindrical formation. The cylindrical members 12 and 14 are secured to an annular magnetic back plate 16, forming a magnetic bridge therebetween.

The pole extensions 13 and 15 are bifurcated into pole portions of unequal widths. The inner pole extensions 13 are thus divided into relatively narrow unshaded pole portions 17 and relatively wide shaded pole portions 18, whereas the outer pole extensions 15 are similarly divided into relatively narrow unshaded pole portions 19 and relatively wide shaded pole portions 20 (Figure 1).

The purpose of making the pole portions 18 and 20 of wider width than their respective adjacent pole portions 17 and 19 is to provide greater permeability or less reluctance for those pole pieces in which the intensity of the magnetic field is diminished by the action of the shading rings. It will be understood that the shading rings produce a flux in the wide pole pieces 18, 20 which is opposite to the flux produced therein by the exciting coil 10. Thus there is actually less flux in the shaded pole pieces and it is desirable that the reluctance offered to this flux shall be as small as possible in order to balance as far as possible the fluxes in the shaded and unshaded pole pieces.

The tips of the pole portions 17, 18, 19 and 20 are bent inwardly as at 21 so as to provide an inner surface substantially matching the rim surface of the rotor employed therewith as hereinafter disclosed. Mounted on the pole portions 17 to 20 inclusive are shading rings 22 of non-magnetic conducting material such as copper, these shading rings being slotted radially as at 23 (Figure 1) so as to interrupt the continuity of each ring.

The shading rings 22 are provided with large apertures 24, completely encircling and thereby shading the relatively wide shaded poles 18 and 20, and are also provided with smaller apertures 25 partly encircling the unshaded narrower pole portions 17 and 19, but preventing from shading the latter by reason of the provision of the radial slots 26.

The front of the space within the cylindrical member 12 is closed by a disc 26a having a central aperture 27 within which is mounted a hub 28 having bored bearing members 29 rotatably supporting the rotor shaft 30. Mounted on the rotor shaft 30 is a rotor hub 31 (Figures 1 and 7) on which in turn is mounted the non-magnetic spider 32, having spokes 33, the outer ends of which engage the annular rotor 34 (Figure 7). The non-magnetic spider 32 may be made of fiber or other suitable material, whereas the magnetic rotor 34 may be made of hardened carbon steel. The rotor 34 is provided with a substantially cylindrical rim 35 and an inwardly extending flange 36 in which are provided arcuate slots 37 and 38 of unequal circumferential lengths.

The cylindrical rim portion 35 of the rotor 34 and the inwardly bent tips 21 of the field pole portions 17, 18, 19 and 20, provide opposing matching surfaces which when the field coil 10 is energized causes the rotor 34 to "float" during its rotation. Any tendency for the rotor to move outward or inward in the direction of its axis of rotation is immediately counteracted by the magnetic forces set up at the pole portion tips 21 so any effect of end thrust chattering is effectively eliminated, and any additional means for eliminating end thrusts is unnecessary.

*Reduction gearing*

The space within the inner cylindrical magnetic member 12 serves to accommodate the reduction gearing for reducing the speed of the rotor shaft 30 to the speed of one revolution per minute necessary for clock driving portions. To this end the interior of the cylindrical magnetic member 12 slidably receives a cylindrical member 40 which abuts the disc 26a and further contains a cylindrical member 41 (Figure 3). Surrounding the inner end of the hub 28 is an annular member 42 held in place by a retaining ring 43. Rotatably mounted thereon is a flange ring 44 serving as a supporter for supporting the planet gear shafts 45. Rotatably mounted upon the planet shafts 45 are planet pinions 46, meshing with the internal ring gear 47, fixedly mounted upon the annular member 41. Rigidly mounted on the hubs of the planet pinions 46 are gears 48 which in turn mesh with the sun gear 49 which is drivingly mounted upon the rotor shaft 30. Also rotatably mounted on the planet shafts 45 are planet pinions 50, meshing with the internal ring gear 51 which is fixedly mounted upon the cylindrical member 41 in a manner similar to that of the ring gear 47. Likewise meshing with the planet pinions 50 is an internal ring gear 52, fixedly secured to the yoke member 53. The latter is in turn mounted upon the output shaft 54 which rotates at one revolution per minute and which actuates the clock. The output shaft 54 is rotatably supported in the bearing members 55 within the hub 56, which in turn is supported by a flanged disc 57, slidably inserted within the cylindrical member 40 and forming an end closure or rear cover plating therefore. The space between the two bearing members 55 is occupied by packing elements 58 for preventing the leakage of oil along the output shaft 54. The planetary reduction gearing described above may be caused to run in oil inserted in the chamber within which the gearing is located.

Modified rotor construction

Figure 9:
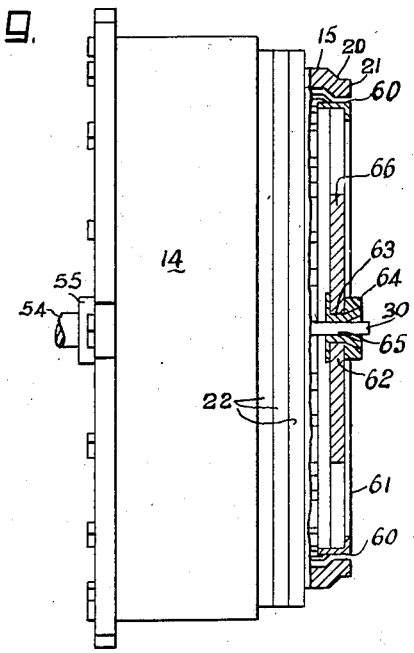
Figure 9 is a radial section through the rotor of Figure 8 taken along the line 9—9 therein.

The modified rotor shown in Figures 8 and 9 consist of a magnetic rim 60 having an inwardly directed flange 61. The rim 60 may be made of hardened carbon steel so as to be permanently magnetized.

Mounted within the rim 60 and against the flange 61 is a magnetic spider, generally designated 62, and having a central aperture 63 for receiving a non-magnetic hub 64, having a bore 65 which in turn receives the rotor shaft 30.

The magnetic spider 62 is likewise construcetd of permanently magnetic material and is provided with Y shaped spokes 66 having bifurcated portions 67 and 68 forming separate poles. Thus the magnetic effect of the rim 60 is amplified by the magnetic effects of the bifurcated poles 67 and 68 of the Y shaped spokes 66 which make up the magnetic spider 62.

Operation

In the operation of the synchronous motor of this invention the energization of the field coil 10, from a suitable source of alternating current such as the ordinary commercial house lighting current sets up magnetic poles of opposite polarity in alternating arrangement around the cylindrical formation in which the pole extensions 13 and 15 are located. The pole extensions 13 coming from the inside of the field coil 10 are of opposite polarity from the pole extensions 15 coming from the outside thereof.

The provision of the bifurcated pole portions 17, 18, 19 and 20 and the shading rings 22 for shading the pole portions 18 and 20, set up a phase lag between the unshaded poles 17 and 19 and the shaded poles 18 and 20. This action sets up a rotating magnetic field which applies a starting torque to the rotor 34 and causes the latter to commence rotation. When the rotor 34 reaches a synchronous speed depending upon the number of poles provided in the motor, it "locks in" at this speed and continues to rotate at the particular synchronous speed for which it was designed. The rotor is prevented from moving axially or directly parallel to its axis of rotation by reason of the components of magnetic force exerted by the bent tips 21 of the pole portions 17, 18, 19 and 20 and the adjacent rotor rim 35. This eliminates the necessity for providing additional means for projecting end motion or end play and causes the rotor to "float" as it rotates during its operation. The rotation thus imparted to the rotor shaft 30, rotates the sun gear 49 which in turn rotates the planet gears 48 and planet pinions 46 around their planet shafts 45. The planet pinions 46 when thus rotated roll around in an orbital path by reason of their engagement with the internal ring gear 47, thereby imparting a rotation to the ring 44 and a consequent orbital motion to the planet shafts 45. The last mentioned motion moves the planet pinions 50 in an orbital path and causes them to roll around the interior of the ring gears 51 and 52 which preferably differ by a single tooth in their number of teeth. This causes a very slow rotation to be imparted to the yoke member 53 and consequently to the output shaft 54. If the constructional characteristics of the motor are properly designed as regard its pole construction and gearing dimensions and number of teeth, the output shaft 54 will rotate at a speed of one revolution per minute. This speed is suitable for driving the mechanism of clocks such as are used extensively.

The synchronous motor of this invention however is not confined to clock uses but may be used for other purposes where a small synchronous motor is necessary, for example, in rotating radio dials, operating phonographs, turn tables, time switches etc.

Under these circumstances the output shaft 54 wound not necessarily rotate at a speed of one revolution per minute. The planet reduction gearing under such circumstances may be omitted entirely where such a large speed reduction is not as necessary as it is in the case of clocks.

Having thus fully described our invention, what we claim as new and desire to secure by Letters Patent, is:

1. A rotor for a synchronous motor which has pole pieces of opposite polarity arranged in adjacent relation to one another in a circular path, said rotor having a magnetic rim adapted to rotate within the circular confines of said pole pieces and being provided with a supporting struture including magnetic spokes which extend substantially radially and terminate at the rim in bifurcated portions.

2. A rotor for a synchronous motor which has pole pieces of opposite polarity arranged in adjacent relation to one another in a circular path, said rotor having a magnetic rim adapted to rotate within the circular confines of said pole pieces and being provided with a supporting structure including magnetic spokes which extend substantially radially and terminate at the rim in bifurcated portions.

3. A rotor for a synchronous motor which has pole pieces of opposite polarity arranged in adjacent relation to one another in a circular path, said rotor having a magnetic rim and a supporting structure therefor including Y-shaped magnetic spokes which extend substantially radially and in which the bifurcated portions are in the region of the rim.

WILLIAM L. HANSEN.
IRA N. HURST.